(12) United States Patent
Menssen et al.

(10) Patent No.: US 8,784,522 B2
(45) Date of Patent: Jul. 22, 2014

(54) AIR FILTER SYSTEM AND FILTER ELEMENT

(71) Applicant: Mann+Hummel GmbH, Ludwigsburg (DE)

(72) Inventors: Joerg Menssen, Tamm (DE); Stefan Becker, Mannheim (DE); Kai Hilarius, Roemerberg (DE); Klaus-Dieter Ruhland, Mackenheim (DE); Steffan Ackermann, Otterstadt (DE)

(73) Assignee: Mann+Hummel GmbH, Ludwigsburg (DE)

(*) Notice: Subject to any disclaimer, the term of this patent is extended or adjusted under 35 U.S.C. 154(b) by 0 days.

(21) Appl. No.: 13/969,942

(22) Filed: Aug. 19, 2013

(65) Prior Publication Data

US 2013/0327005 A1 Dec. 12, 2013

Related U.S. Application Data

(63) Continuation of application No. PCT/EP2012/052696, filed on Feb. 16, 2012.

(30) Foreign Application Priority Data

Feb. 17, 2011 (DE) .......................... 10 2011 011 595

(51) Int. Cl.
*B01D 50/00* (2006.01)

(52) U.S. Cl.
USPC ................ 55/337; 55/385.3; 55/321; 55/480; 55/482; 55/491; 55/492; 55/511; 55/DIG. 5; 55/DIG. 31; 55/497

(58) Field of Classification Search
CPC ............. B01D 46/0005; B01D 46/521; B01D 46/2411; B01D 46/10

USPC ........ 55/337, 385.3, 321, 480, 482, 491–511, 55/DIG. 31, DIG. 5; 123/198 E
See application file for complete search history.

(56) References Cited

U.S. PATENT DOCUMENTS

| 2010/0107580 A1 | 5/2010 | Thienel |
| 2010/0162673 A1 | 7/2010 | Grosche |
| 2010/0186353 A1 | 7/2010 | Ackermann et al. |
| 2011/0167776 A1* | 7/2011 | Gorg et al. ...................... 55/493 |

FOREIGN PATENT DOCUMENTS

| DE | 1611083 A1 | 5/1971 |
| DE | 29806916 U1 | 7/1998 |
| DE | 202005003046 U1 | 7/2006 |
| DE | 102009013529 A1 | 10/2009 |
| DE | 202008014053 U1 | 3/2010 |
| WO | WO2006017790 A1 | 2/2006 |

* cited by examiner

*Primary Examiner* — In Suk Bullock
*Assistant Examiner* — Dung H Bui
(74) *Attorney, Agent, or Firm* — James Hasselbeck

(57) ABSTRACT

An air filter system (30) includes a filter housing (10) with a filter element (1) received within the housing. A secondary housing is secured to and closing the filter housing. The secondary housing includes a locking element operable to engage the filter housing and the filter element. The filter element (1) includes at least one fastening element (7) wherein the locking element (22) of the secondary housing (20) engages the at least one fastening element (7) in such a way, when the filter element (1) is accommodated in the filter housing (10) and is disposed between the filter housing (10) and the secondary housing (20), that the secondary housing (20) is detachably clamped to the filter housing (10).

13 Claims, 10 Drawing Sheets

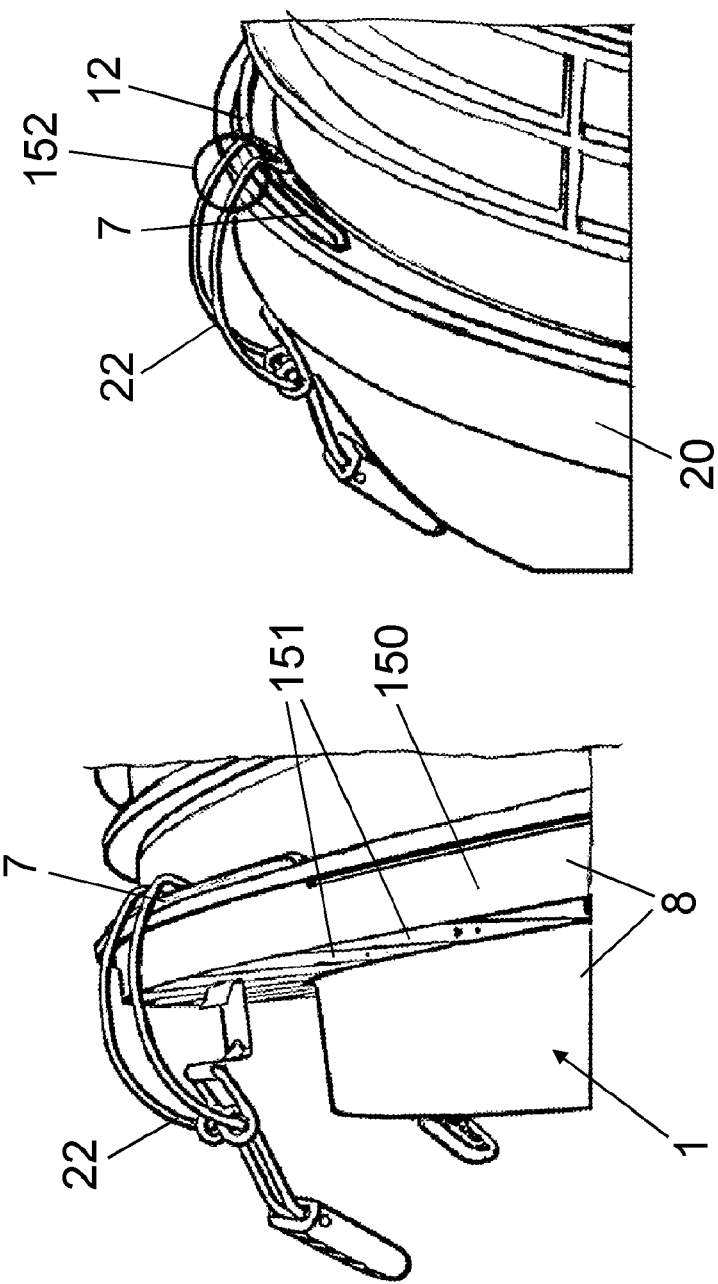

AIR FILTER SYSTEM AND FILTER ELEMENT

CROSS REFERENCE TO RELATED APPLICATIONS

This application is bypass continuation of international patent application no. PCT/EP2012/052696, filed Feb. 16, 2012 designating the United States of America, the entire disclosure of which is incorporated herein by reference. Priority is claimed through PCT/EP2012/052696 to German patent application no. 10 2011 011 595.1, filed Feb. 17, 2011.

TECHNICAL FIELD

The present invention relates to an air filter system and a filter element for an air filter system, in particular for a multi-stage air filter with cyclone precleaner.

BACKGROUND ART

Cyclone separator, also called centrifugal force separator, cyclone or cyclone filter, are used to separate solid or liquid particles contained in gases.

In the cyclone separator, gases together with the particles are set into a rotating movement by a corresponding constructive design. The centrifugal forces acting on the particles accelerate them radially outwards. As a result, they are separated from the gas flow, which is guided inwardly and discharged.

Due to the moderate filtration performance with very fine particles compared with other methods, the cyclone filtration is often used as part of a filter chain in a multi-stage air filter system. For separating fine dust particles it is, therefore, state-of-the-art to equip the cyclone filter additionally with a conventional final filter. The air pre-cleaned by the cyclone filtration is conveyed through the filter medium of the final filter, wherein impurities of the air are deposited on the filter medium. By so doing, it is possible to enhance the filtration performance of the cyclone filter.

The state-of-the-art filter elements are in some cases only insufficiently adapted to cope with the special requirements for being used as final filter in an air filtering in a cyclone filter downstream of the cyclone filtration. One problem, in particular, is that the air is swirled after the cyclone filtration. As a result, the filter medium of the final filter is flowed through irregularly, thus reducing the filtering effect.

Furthermore, conventional state-of-the-art filter elements are commonly equipped with filter media having cross-sections in even, round or oval shape. If a filter medium is now provided with an optimized cross-section shape for achieving an enhanced filtration performance, a particularly high degree of air purity can be achieved with the air exiting the filter.

Technical systems, consisting for example of an internal combustion engine and the upstream air filter for cleaning the inlet air to the combustion chamber of the internal combustion engine, are often developed as an overall system. As a consequence, specific requirements for the maximum mounting space, the accessibility for changing the filter element, the pressure loss in the system and the degree of purity of the air supplied to the internal combustion engine and therefore also to the filtration performance of the upstream air filter result from this.

Furthermore, single- and multi-stage filter systems, in particular with a cyclone precleaner, often have, for example, the disadvantage that changing the filter elements requires more effort because of the mounting space conditions.

DISCLOSURE OF THE INVENTION

It is therefore the objective of the present invention to provide an enhanced air filter housing, an enhanced air filter element and an enhanced air filter system, in particular for a multi-stage filter system with cyclone precleaner, which in particular allow a straightforward and/or reliable assembly and in particular an optimized flow.

This objective is accomplished by an air filter system with the characteristics of claims.

A corresponding filter housing such as, for example for an or with an integrated cyclone precleaner, is configured for an inner accommodation and locking of a filter element, the filter element featuring at least one fastening element, to which, when the filter element is accommodated in the filter housing and disposed between the filter housing and a secondary housing, a locking element each of the secondary housing can engage such that the secondary housing can be clamped to the filter housing.

A clamping of the filter housing and the secondary housing and thus the locking of the filter element between the filter housing and the secondary housing is realized by means of the fastening element of the filter element. If the filter element does not feature a corresponding fastening element, because for example a third-party filter element is inserted, a clamping of the secondary housing to the filter housing is not possible. This ensures that only filter elements can be used, which feature the corresponding fastening element. It is furthermore ensured that the filter housing cannot be closed without a filter element being installed. As a result, in particular an operating error which can lead to an operation without filter element and therefore to damages of the internal combustion engine, is avoided.

As secondary housing can particularly be conceived: cover plates, intake grilles, cyclone blocks, cyclone precleaners (blocks) and/or housing covers, in particular with inlets and outlets.

In embodiments, the filter element is completely accommodated by the filter housing. The filter housing encloses for example the volume of the filter element. It is possible that the filter housing or a corresponding filter assembly, which comprises the filter housing, the filter element and the secondary housing, is designed in such a way that the fastening element and the locking element allow a clamping of the filter element between the filter housing and the secondary housing only if it is completely accommodated in the filter housing.

To realize this, the fastening element is preferably designed as protrusion that extends through a hole on the filter housing and protrudes beyond it, when the filter element is assembled with the filter housing in such a way that the filter element is, preferably completely, accommodated in the filter housing. The locking elements on the secondary housing are preferably designed as fixing elements, which are locked or caught with the associated fastening element.

By protruding through the filter housing, the fastening elements create contact points, with which the locking elements can be locked. If the filter element is inserted into a filter housing that does not feature the corresponding protrusions, a locking by means of the locking elements will not be possible, so that the insertion of incorrect filter elements and thus a deterioration of the filtration performance is avoided. The fastening elements preferably protrude through the holes towards the filter housing in the direction in which the filter element can be installed or inserted into the housing, i.e. in mounting direction. Furthermore, the fastening elements preferably protrude through the holes outside of a sealing of the filter element. The holes are therefore preferably disposed outside of the interior space of the filter housing in which the filter element can be accommodated, and thus in particular also outside of the sealing surface of the filter housing.

According to a preferred embodiment, the locking elements have a hook-shaped design and engage behind the respective fastening element or into the recess or undercut at the respective fastening element. As a result, a locked form-fit and/or force-fit connection is created. As a result, the connection of filter housing and secondary housing can be easily and quickly disconnected and realized without additional tools. A quick and straightforward change of the filter element is possible.

The locking elements on the secondary housing are preferably at least partially resilient and particularly preferred designed as metal clamps or brackets. As a result, the locking elements can be easily snapped in place behind the fastening elements by resiliently deforming them during the snap-in process or during clamping of the filter housing to the filter element and the secondary housing. As a result, an additional resilient bearing of the locking elements can be avoided.

According to a preferred embodiment, the holes on the filter housing are disposed on the side facing away from the filter element on inclined filter housing sections which extend under an angle between 45 and 90 degrees in relation to the longitudinal extension direction of the respective associated hole. As a result, it is possible that the locking element on the filter housing, namely on the inclined filter housing sections, slides downwards, if no protrusions of the filter element project from the holes in the filter housing, i.e. if no filter element with the protrusions is inserted. In this case, the inclined filter housing sections allow a reliable sliding of the locking elements on the filter housing.

According to a preferred embodiment, the filter housing features inner ribs, which extend in installation direction of the filter element along the filter element. These ribs extend preferably in the installation direction of the filter element. An accommodated filter element extends then by abutting on the ribs. For example, the totality of the ribs extending inwardly reproduces an outer cross-sectional contour of the filter element. Using the ribs avoids using an inappropriate filter medium, that makes it necessary to sealingly contact the interior side of the filter housing. This will ensure that the inflow space can be kept in the preferred size when using replacement filter elements.

According to a preferred embodiment, the filter housing features an oval inner housing cross-section shape. The filter element can also have an oval, however also a kidney-shaped or octagon-shaped cross-section shape. As a result, the use of filter elements that are not compatible can be made particularly difficult.

According to a preferred embodiment, a sealing plate is disposed between filter housing and filter element. Furthermore, this features preferably protrusions, which engage in recesses on the filter housing or into the holes. By this measure, a correct positional orientation of the sealing plate is forced in order to achieve a reliable sealing of filter housing and filter element. The sealing plate is, for example, part of the filter element. The sealing plate is preferably disposed on an end disk or end plate of the filter element or designed as one of these. The shape of the sealing plate is preferably adapted to the shape of the two adjacent housing components, which means to the filter housing and the secondary housing.

The sealing plate is preferably provided with an annular sealing, which can be sealingly brought into engagement with a corresponding sealing area of the filter housing. The sealing plate and the associated sealing surface of the filter housing are preferably designed on one narrow side essentially rectangular (in this case, the angles can be rounded), and on the other narrow side in the shape of a semicircle or half of an ellipsis. As a result, a correctly positioned mounting of the filter element can be ensured. Preferably, the annular sealing for sealing the filter element in the filter housing extends along this shape. This is particularly advantageous for a precise signal of the air-flow meter, for it can be ensured that irregularities in the filter element structure are always disposed at the same location in the housing. These irregularities can, for example, be the connection point of an annularly closed folded filter bellows or the initial or end points of a semi-finished filter material with alternately closed ducts wound in particular onto a core.

In one embodiment, a filter element, comprising a star-shaped folded, annular, in particular circular ring-shaped closed filter bellows made of a filter medium such as, for example, fleece or cellulose or a combination thereof as well as a corresponding filter housing for a filter system, is provided. The filter element features at the top end a sealing, in particular round end disk, which sealingly closes a front face of the filter element and thus separates the raw side outside of the filter element from the clean side in the filter element interior space. The end disk features in particular several fastening elements, e.g. in the shape of protrusions or buttstraps, which can be in particular disposed at an annular extension of the end disk, which are, for example, connected with the inner area of the end disk, which encloses the frontal end of the filter element by means of star-shaped disposed distance ribs or a distance ring.

In an embodiment of the filter housing corresponding to the filter element, preferably openings or holes are disposed into which can engage the protrusions of the filter element. Once the filter element is accommodated in the filter housing, the protrusions engage preferably into the holes. In this case, the protrusions in the area of the holes are so long that they protrude from the holes of the filter housing. The openings are preferably provided outside of the filter housing interior space and do not create an access to the interior space of the air filter. In this case, the filter element is disposed particularly with its end disk between the filter housing and a secondary housing designed as housing cover.

In one embodiment, locking elements, which are for example attached to the secondary housing in the form of wire clamps or engaging members, can then engage into the protrusions where they protrude from the filter housing, so that the filter element can then be clamped between the secondary housing and the filter housing. Several locking elements and corresponding protrusions and openings are preferably provided which are preferably evenly distributed across the circumference of the in particular circular end disk. Preferably 2-6, particularly preferred 3-5 locking elements are provided.

In one embodiment, the end disk of the filter element is disposed between the secondary housing and the filter housing, wherein the end disk is clamped between the two components when the locking elements engage behind the protrusions.

In one embodiment, the protrusions are provided for engaging through the openings on the filter housing and prevent also a rotating movement of the filter element in the filter housing when they are in the engagement position. As a result, a rotation of the filter element in operation and thus an undesired modification of the air-flow meter signal can be prevented Further embodiments of the invention are subject of the subclaims as well as of the examples of an embodiment of the invention described in the following. Furthermore, the invention is explained in detail based on examples of an embodiment with reference to the attached figures.

BRIEF DESCRIPTION OF THE DRAWINGS

It is shown in:

FIGS. 10 and 10A schematic perspective sectional representations of the example of an embodiment shown in FIGS. 9 and 9A;

In the figures, the same reference numerals denote identical or analog components, unless otherwise stated.

DETAILED DESCRIPTION

Figure 1:
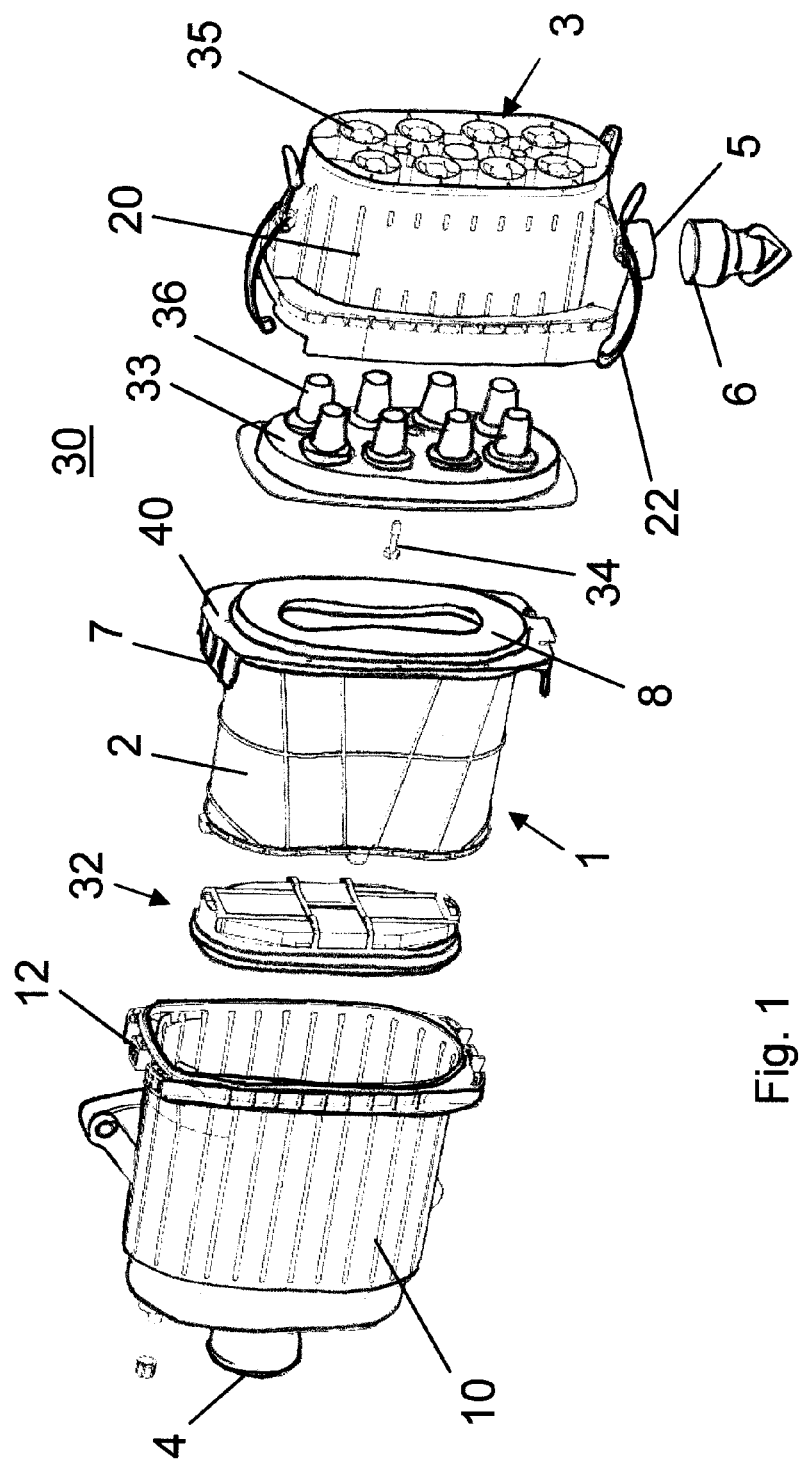
FIG. 1: a schematic perspective exploded view of an air filter with a filter housing and filter element according to a first example of an embodiment.
Figure 2:
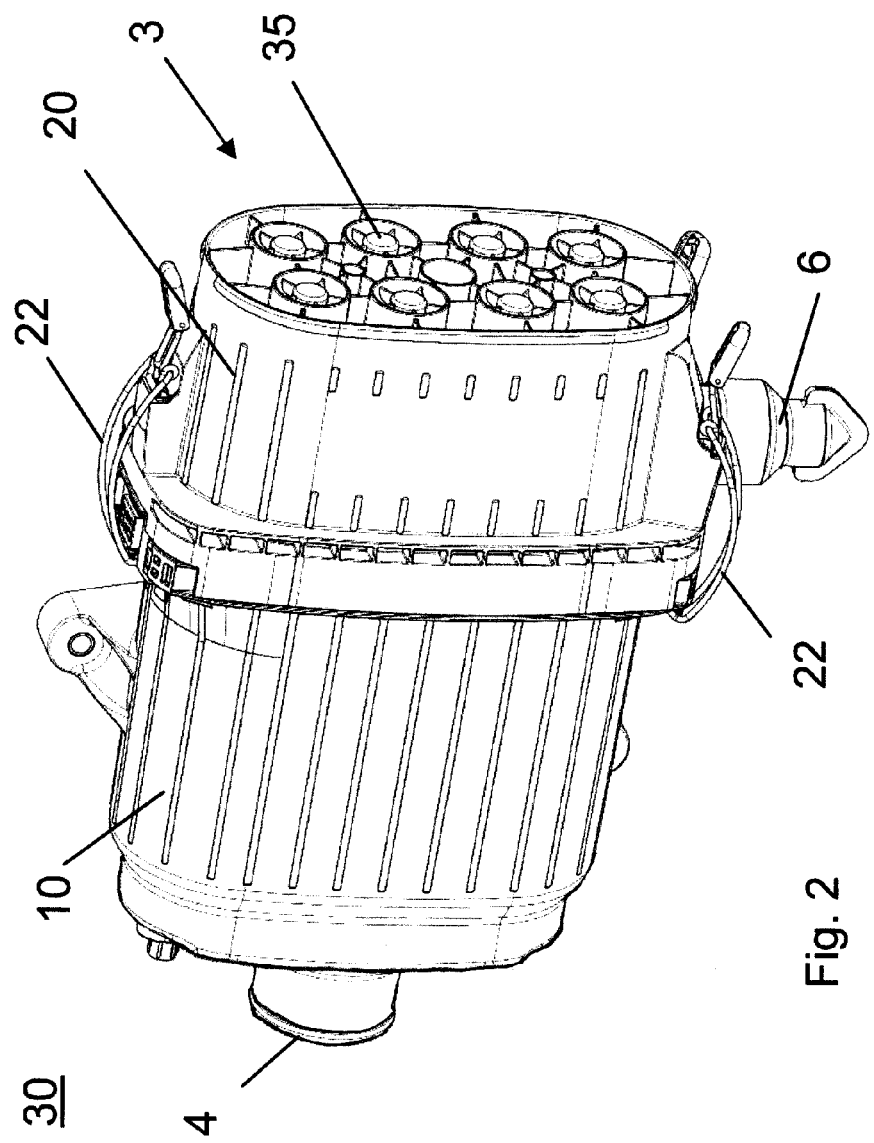
FIG. 2: a schematic perspective representation of the air filter in mounted state according to the first example of an embodiment.

FIG. 1 shows a schematic perspective exploded view of an air filter 30 with a filter housing 10 and filter element 1 according to a first example of an embodiment. FIG. 2 shows the air filter 30 in an assembled state. In the orientation of FIGS. 1 and 2, the air to be cleaned flows from the right to an inlet 3, flows through the multi-stage filter chain, which is called air filter 30, and exits from an outlet 4 at the left in cleaned condition. The cyclone separation is carried out by an assembly consisting of a cyclone upper section, which is called secondary housing 20 in the following, and a cyclone bottom section 33. Several immersion tubes 36, which cooperate with individual centrifugal force separators 35 on the secondary housing 20, can be recognized at the cyclone bottom section 33. The cyclone bottom section 33 is held by means of a fastening element, for example a screw 34, at the cyclone upper section or secondary housing 20.

Raw air is supplied at the inlet 3 into the air filter 30 on the side of the cyclone upper section 20. The cyclone separation removes coarse particles from the air, which are collected in the bottom section of the secondary housing 20. A particle removal opening 5, which is closed by a valve 6, is provided. The accumulated particles can be removed in predefined maintenance intervals, however, the valve can also be opened manually.

The air is then guided through the filter medium 2 of the filter element 1 represented in the figure to the left of the cyclone bottom section 33 to carry out a further filtration of particles, in particular of fine particles. A further filter element is provided downstream as secondary element 32. The air is additionally filtered by means of the secondary element 32 and exits at the outlet 4 of the filter housing 10 as filtered air.

The filter element 1 features at the top end a sealing end disk 8, which has several fastening elements 7 in the shape of protrusions or buttstraps. Openings or holes 12 are disposed in receptacles on the filter housing 10, into which can engage the protrusions 7. Once the filter element 1 is accommodated in the filter housing 10, that means if they are in FIG. 1 completely telescoped essentially in horizontal direction, the protrusions 7 engage into the holes 12. In this case, the protrusions 7 in the area of the holes 12 are so long that they protrude in the orientation of FIG. 1 in the picture to the left from the holes 12 of the filter housing 10. The openings 12 are provided outside of the filter housing 10 and do not create an access to the interior space of the air filter 30. In this case, the filter element 1 is disposed particularly with its end disk 8 between the filter housing 10 and the secondary housing 20.

Locking elements 22, which are attached to the secondary housing 20 in the form of wire clamps in this example of an embodiment, can then engage into the protrusions 7 where they protrude from the filter housing 10, so that the filter element 1 can then be clamped between the secondary housing 20 and the filter housing 10.

Figure 1A:
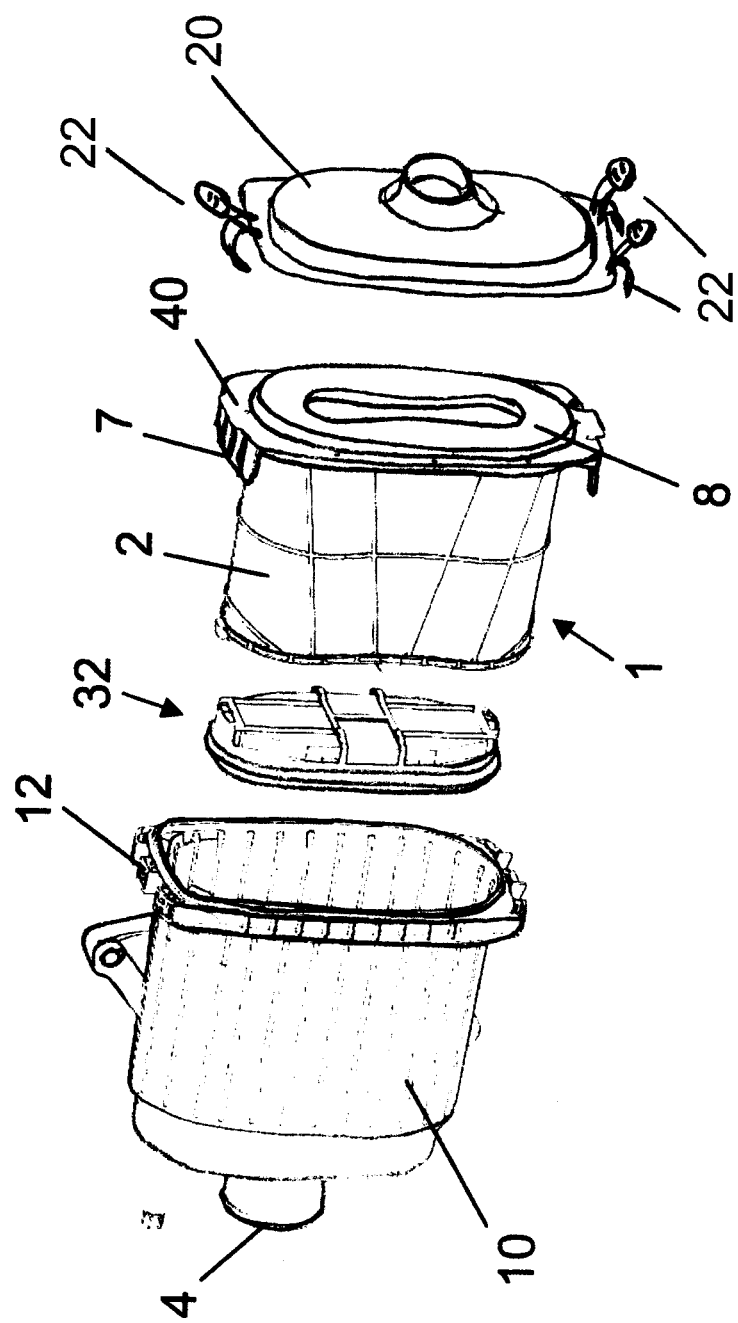
FIG. 1A: an alternative embodiment of the example of an embodiment according to FIG. 1.

FIG. 1A shows an embodiment derived from that in FIG. 1 in which the secondary housing 20 is shown as housing cover with inlet port, wherein the housing cover is also provided with locking elements 22.

Figure 3:
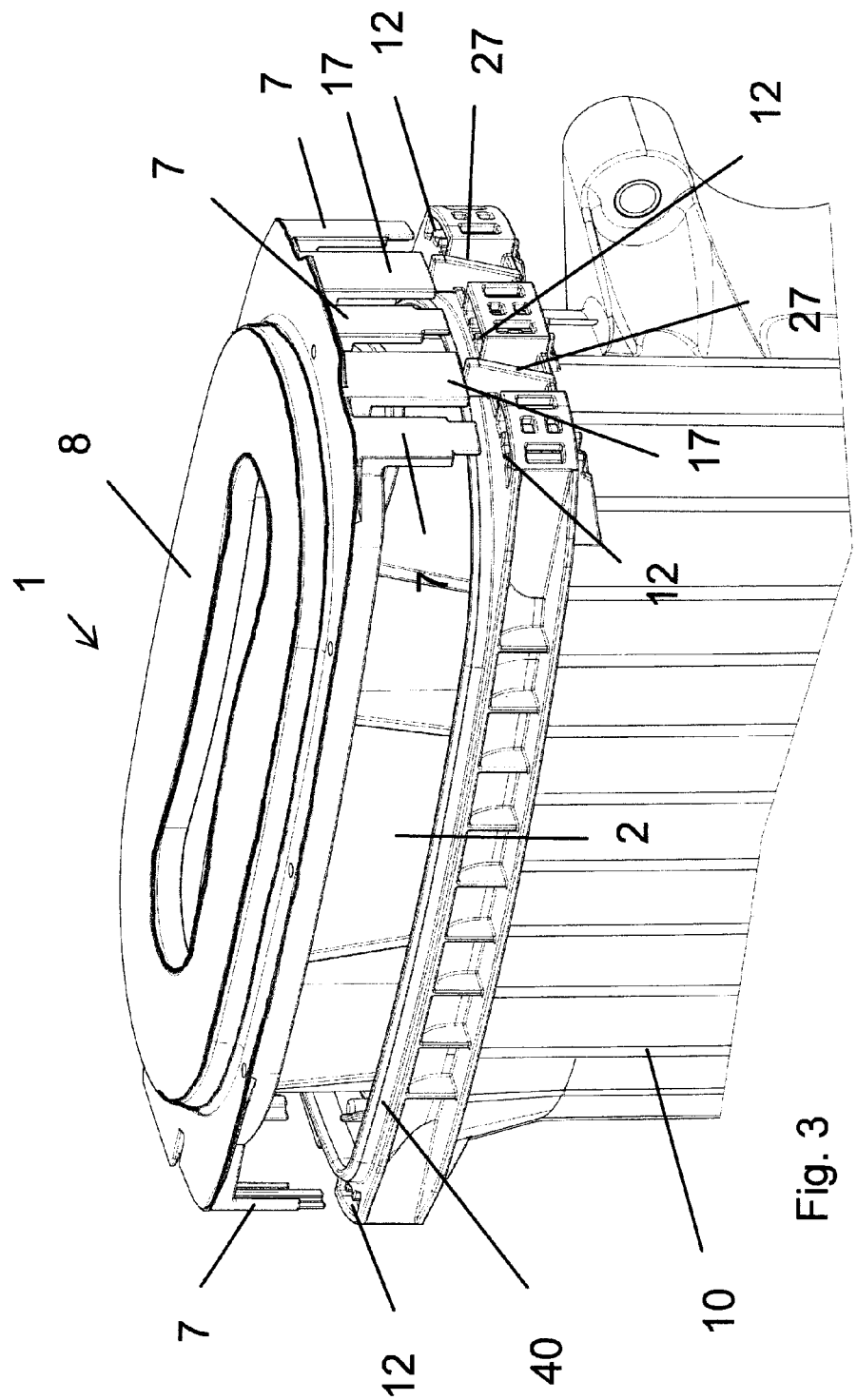
FIG. 3-5: schematic perspective sectional representations of the air filter according to the first example of an embodiment.
Figure 4:
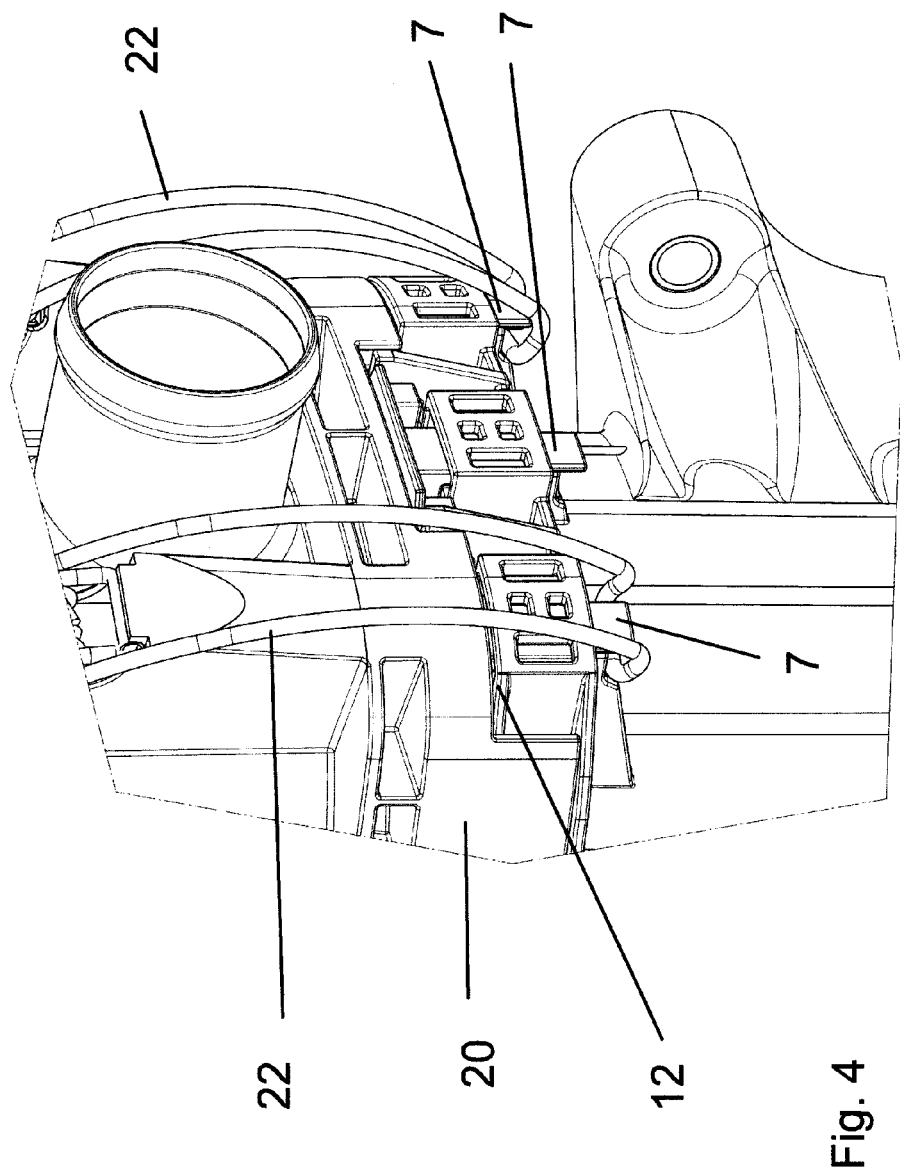
Figure 5:
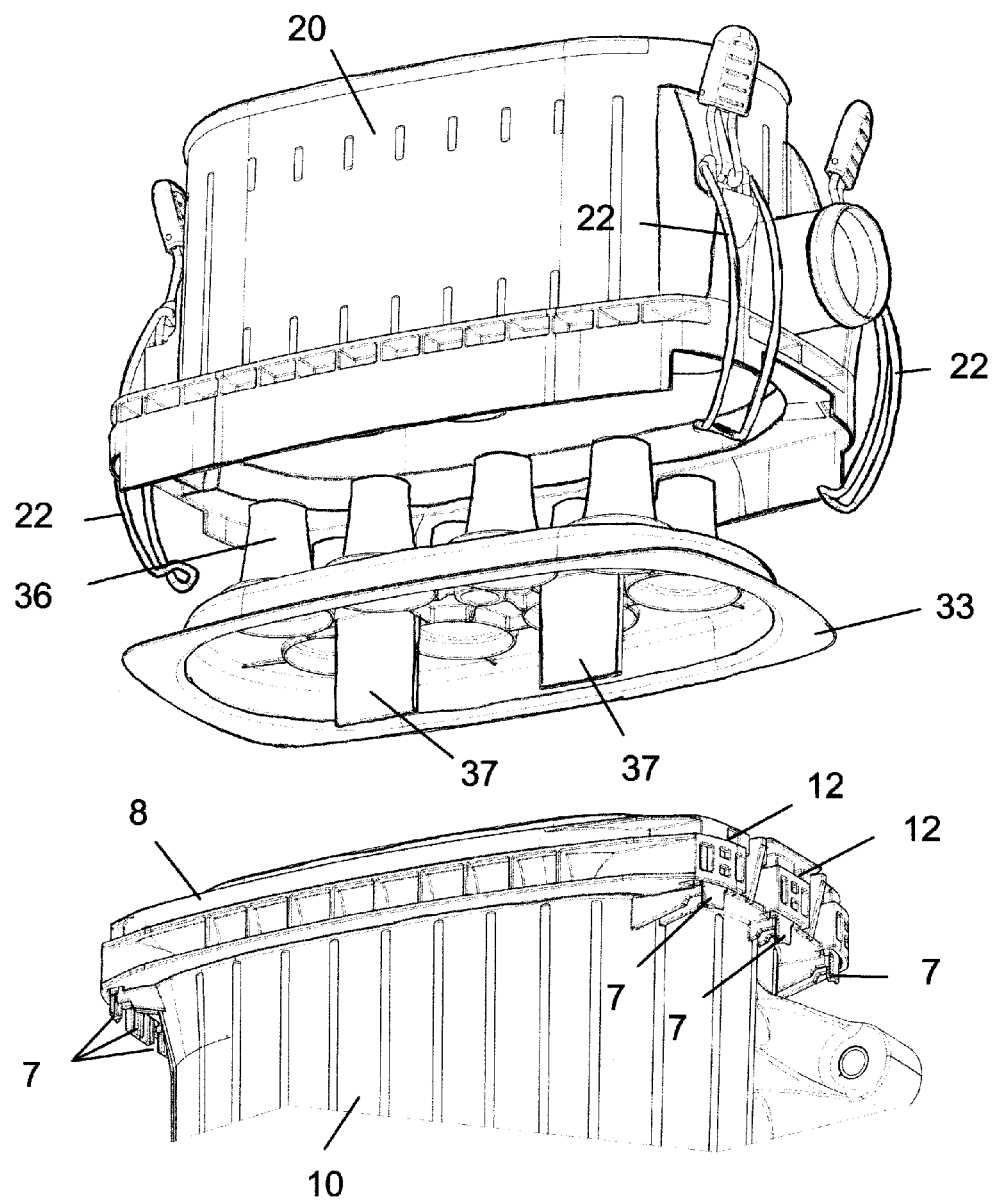

FIGS. 3-5 show schematic perspective sectional representations of a filter housing 10 and secondary housing 20 with accommodated filter element 1 according to the example of an embodiment in FIG. 1. In the orientation of FIGS. 3-5 at the top is represented the secondary housing 20 with the (hidden) cyclone separators and below the filter housing 10. Between the secondary housing 20 and the filter housing 10 are disposed the cyclone bottom section 33 and the end disk 8 of the filter element 1. From the filter element 1 or the end plate 8 protrusions 7 can be recognized, for the filter element 1 is accommodated in the filter housing 10. It can be seen in FIG. 3 that protrusions 7 are, on the one hand, provided for being inserted through the holes 12 on the filter housing 10, and that, on the other hand, further protrusions 17 are provided. The protrusions 7 extend through the openings 12 in the filter housing 10. For the further protrusions 17, there are no associated openings on the filter housing 10 on the right side in the orientation of FIG. 3. On the other hand, blocking ribs 27 are provided on the exterior side of the filter housing 10, which prevent the filter element 1 from moving downwards. In case the mounting orientation is not used as intended, the filter element 1 can not be accommodated completely in the housing 10. This ensures that the sealing end disk 8 is accurately placed onto the edge 40 of the filter housing 10 and that it can close fluid-tightly.

FIGS. 4 and 5 show the assembly according to the intended use of the filter element 1 and the housing components 10, 20. The locking element 22 attached to the secondary housing 20, which is realized in this example of an embodiment as wire clamp or bracket, clamps the secondary housing 20 and in particular the cyclone bottom section 33 against the filter housing 10 with the filter element 1 therebetween. A slipping of the locking element 22 on the filter housing 10 is prevented by allowing the locking element to engage behind the respective protrusion 7 and to hold the grip. Thus, the respective protrusion 7, which is provided at the filter element 1, allows in cooperation with the openings 12, that the secondary housing 20 can be clamped to the filter housing 10 by means of the locking elements 22. If third-party filter elements 1 are used, which do not feature the protrusions 7 or have them at another position, the locking elements 22 slip off the filter housing, and the permanent connection of secondary housing 20 and filter housing 10 is prevented. As a result, the improper use of inappropriate filter elements 1 can be prevented.

Furthermore, in FIG. 5 is illustrated that two blades 37 on the cyclone bottom section 33 besides the immersion tubes 36 towards the secondary housing 20 extend into the direction of the filter element 1 into the interior space. The blades 37 are designed such that, with suitable filter elements 1, they engage exactly into the gaps in the filter medium 2. Otherwise, an inappropriate filter element blocks the assembly of the air filter 30. Due to the blades 37, the air exiting the cyclones can be calmed down on its way to the filter element 1, so that a homogeneous oncoming flow of the filter element can be achieved.

Figure 6:
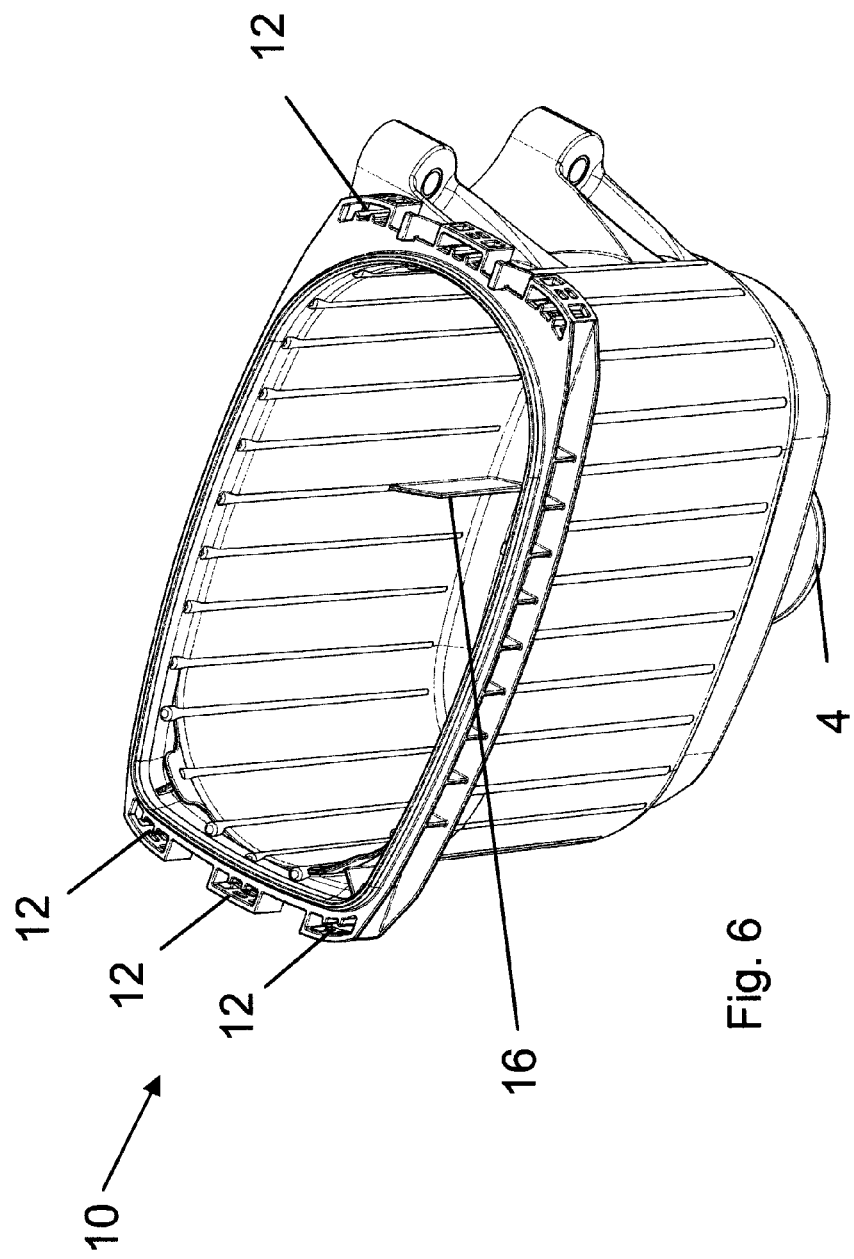
FIG. 6: a perspective representation of a filter housing.

FIG. 6 shows a perspective view of the filter housing 10 with view into the interior space. Inner ribs 16 are provided on the filter housing 10. These ribs 16 extend in the installation direction of the filter element 1 and reach the inside of the interior space. An accommodated filter element 1 extends then by abutting on the ribs 16. The ribs 16 reproduce a cross-sectional contour of the respective filter element to be inserted. Using the ribs 16 avoids using a filter element with a shape other than for the intended use. This will ensure that the inflow space can be kept in the preferred size when using replacement filter elements. The ribs 16 can furthermore serve to homogenize the flow on the outflow side of the filter element and in this case they can in particular advantageously interact with with the blades 37.

Figure 7:
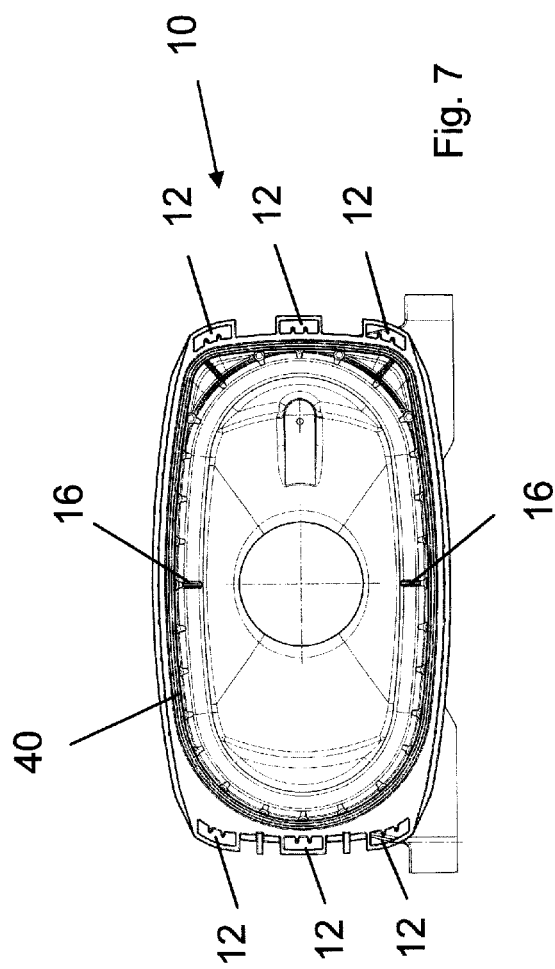
FIGS. 7 and 8: top views of examples of an embodiment of the filter housing and filter element.
Figure 8:
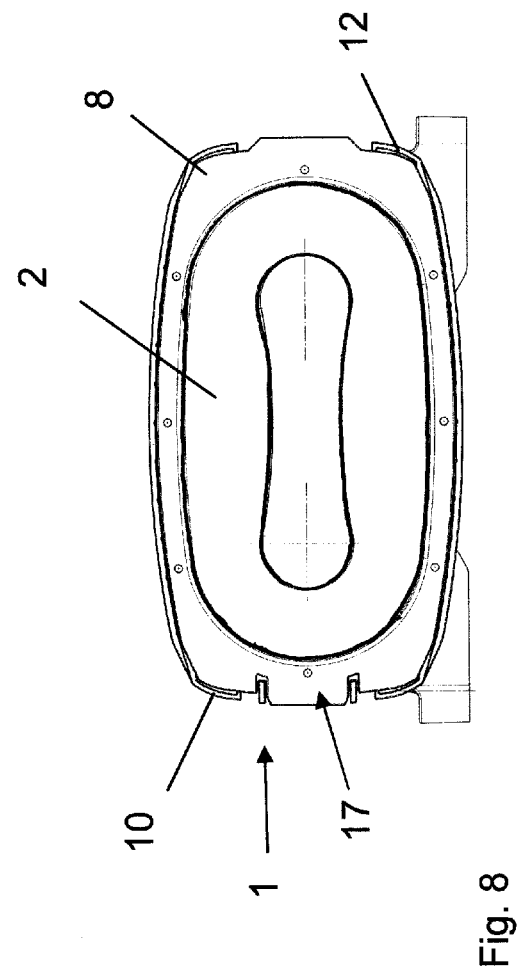

FIG. 7 illustrates the filter housing 10 in top view, and FIG. 8 an appropriate filter element 1, which is inserted into the filter housing 10. The ribs 16 and the shape of the filter element 1 with its filter medium 2 are adapted to each other in such a way that exclusively provided filter elements can be completely accommodated in the filter housing 10 as a type of a key-lock principle. Furthermore, the top view shows that the further protrusion 17 will not be blocked by a blocking element 27 (cf. FIG. 3), if the filter element 1 is correctly oriented in relation to the filter housing 10. In this case, the end disk 8 has a shape adapted to the sealing edge 40. In this way, a good seal seat is necessarily achieved.

Figures 9, 9A:
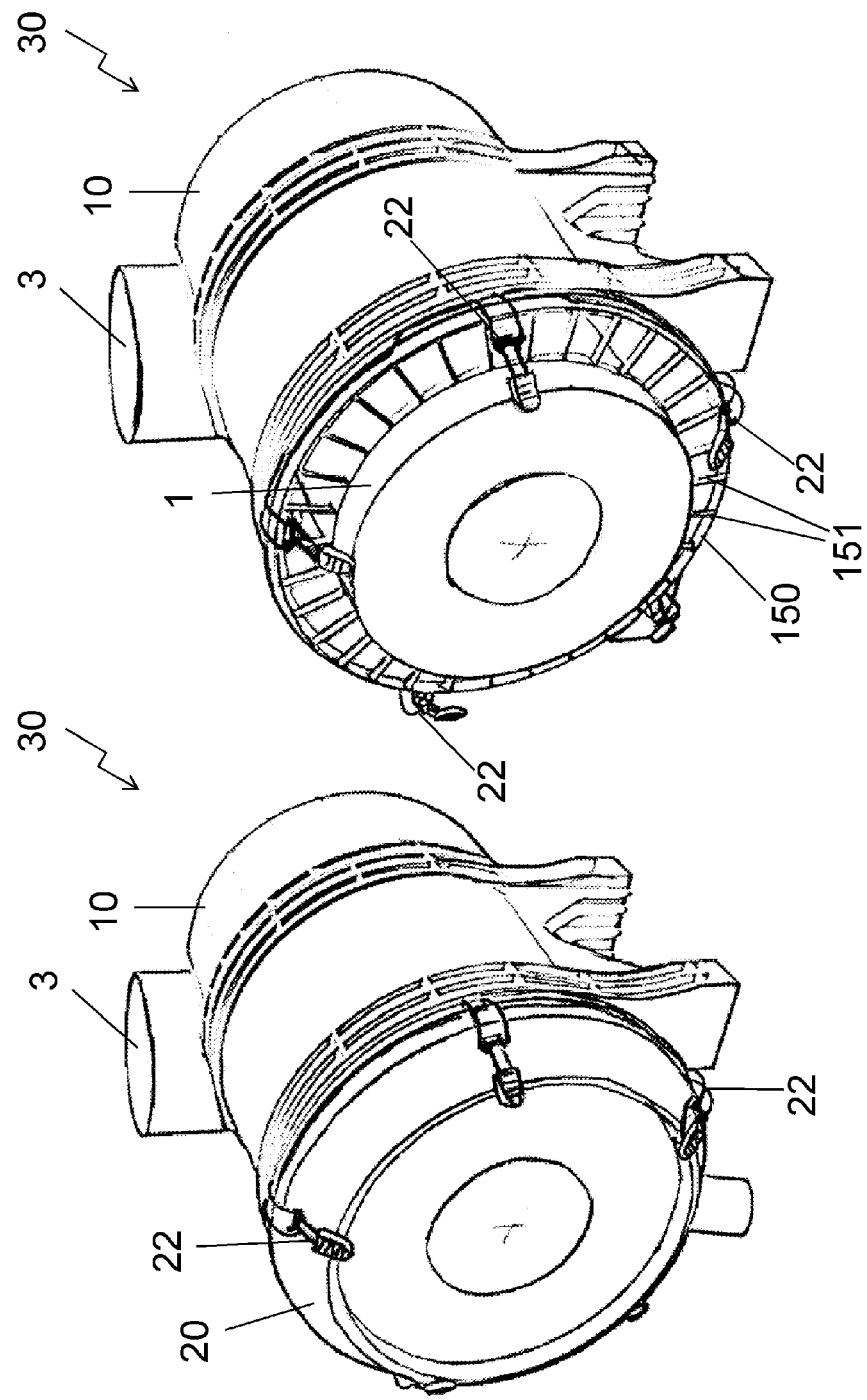
FIGS. 9 and 9A schematic perspective representations of a further example of an embodiment of an air filter.

FIGS. 9 and 10 show a further example of an embodiment of the invention. In this case, FIGS. 9A and 10A correspond to the FIGS. 9 and 10, respectively, wherein however the secondary housing 20 designed as housing cover is blanked out for an enhanced visibility. However, the fastening elements 22, designed here as clamping brackets made of wire, which are attached to the housing cover 20 and can be removed with it, are still visible.

The air filter 30 shown in FIGS. 9-10 comprises a filter housing 10 and filter element 1. Air to be cleaned flows from the top to an inlet 3, flows through the round filter element 1 and exits from an outlet not shown here in the perspective-rear area on the rear front face of the housing in cleaned condition.

The filter element 1 comprises a star-shaped folded, annular, in particular circular ring-shaped closed filter bellows made of a filter medium such as, for example, fleece or cellulose or a combination thereof. It features at the top end a sealing, round end disk 8, which sealingly closes a front face of the filter element and thus separates the raw side outside of the filter element from the clean side in the filter element interior space. The end disk features several fastening elements 7 in the shape of protrusions or buttstraps, which can be in particular disposed as shown at an annular extension 150 of the end disk, which is connected with the inner area of the end disk, which encloses the frontal end of the filter element by means of star-shaped disposed distance ribs or a distance ring. Openings or holes 12 are disposed in the filter housing 10, into which can engage the protrusions 7. Once the filter element is accommodated in the filter housing 10, that means if they are in FIG. 9-10 completely telescoped essentially in horizontal direction, the protrusions 7 engage into the holes 12. In this case, the protrusions 7 in the area of the holes 12 are so long that they protrude in the orientation of FIG. 1 in the picture to the right from the holes 12 of the filter housing 10. The openings 12 are provided outside of the filter housing 10 and do not create an access to the interior space of the air filter 30. In this case, the filter element 1 is particularly disposed with its end disk 8 between the filter housing 10 and the secondary housing 20 designed as housing cover.

Locking elements 22, which are attached to the secondary housing 20 in the form of wire clamps in this example of an embodiment, can then engage into the protrusions 7, in the engagement area 152, where the protrusions 7 protrude from the filter housing 10, so that the filter element 1 can then be clamped between the secondary housing 20 and the filter housing 10. Several locking elements 22 and corresponding protrusions 7 and openings 9 are preferably provided which are preferably evenly distributed across the circumference of the end disk. A mounting of the housing cover 20 is therefore impossible without installed filter element 1, so that an operation of the device without effective filtration can be avoided. Preferably 2-6, particularly preferred 3-5 locking elements 22 are provided.

The end disk 8 of the filter element 1 is disposed between the secondary housing 20 and the filter housing 10, wherein the end disk is clamped between the two components when the locking elements 22 engage behind the protrusions 7. The protrusions 7 are provided for engaging through the openings 12 on the filter housing 10 and prevent a rotating movement of the filter element 1 in the filter housing 10 when they are in the engagement position. A rotation of the filter element in case of vibration load can often happen during operation of the device. In this case, irregularities in the filter element, e.g. irregular loading or the connection point of an annularly closed folded filter bellows which is difficult to be locally flowed through due to changing flow conditions can result in a modification of the signal of the air-flow sensor that is not desired. As a result, a rotation of the filter element in operation and thus an undesired modification of the air-flow meter signal can be prevented by the described assembly. The FIGS. 9-10 show the assembly according to the intended use of the filter element 1 and the housing components 10, 20. The locking elements 22 attached to the secondary housing 20, which are realized in this example of an embodiment as wire clamp or bracket, clamp the secondary housing 20 designed as housing cover against the filter housing 10 with the filter element 1 therebetween. A slipping of the locking element 22 on the filter housing 10 is prevented by allowing the locking element to engage behind the respective protrusion 7 and to hold the grip. Thus, the respective protrusion 7, which is provided at the filter element 1, in particular at its end disk 8, allows in cooperation with the openings 12, that the secondary housing 20 can be clamped to the filter housing 10 by means of the locking elements 22.

Although the present invention has been described above by means of preferred examples of an embodiment, it is not limited thereto, but it can be modified in various ways. In particular, filter element and housing can also be adapted to other filter types than cyclone filters or equipment. It is also conceivable to provide three or more than four buttstraps for clamping the housing components.

The invention claimed is:

1. An air filter system (30) for the intake air of internal combustion engines, comprising:
    a filter housing (10);
    an annular filter element (1) replaceably received into a chamber within the filter housing;

a secondary housing (20) secured to and closing the filter housing (10) such that the secondary housing and filter housing enclosed the filter element in the chamber therein, the secondary housing including:
  at least one locking element (22) operable to engage the filter housing and the filter element to lock the housing closed and lock the filter element therein;
wherein the filter housing (10) is designed to internally accommodate and lock the filter element (1) therein;
wherein the filter element (1) includes
  an end disk (8) secured onto an axial end face of the filter element (1), the end disk sealingly closing the axial end face separating a raw side from a clean side of the filter element;
  at least one fastening element (7), each embodied as an elongated axial protrusion (7) having a first end arranged at and secured onto a radially outer portion of the end disk (8), the elongated axial protrusion (7) elongated in an axial direction extending axially away from the end disk (8);
wherein the filter housing (10) on its exterior forms a least one receptacle (12) arranged on the exterior of the filter housing and having an axially extending hole (12) extending through the receptacle and opening at opposing axial sides of the receptacle;
wherein the protrusion (7) extends axially from the filter element end disk and completely through the hole and continues outwardly beyond the hole when the filter element (1) is assembled with the filter housing (10) in such a way that the filter element (1) is accommodated in the filter housing (10);
wherein a portion of the axial protrusion that continues outwardly beyond the hole has a locking surface;
wherein the at least one locking element (22) of the secondary housing (20) engages the at least one fastening element (7) in such a way, when the filter element (1) is accommodated in the filter housing (10) and is disposed between the filter housing (10) and the secondary housing (20), that the secondary housing (20) is detachably clamped to the filter housing (10).

2. The air filter system (30) according to claim 1, wherein the filter element include a sealing element secured thereto and having a sealing element surface corresponding to a complimentary sealing surface of the filter housing (10);
wherein the sealing element is sealingly pressed against by press-fitted onto the corresponding sealing surface of the filter housing (10) when the secondary housing (20) is clamped to the filter housing (10).

3. The air filter system (30) according to claim 1, wherein the at least one locking element (22) on the secondary housing (20) are pivotally mounted to the secondary housing, each of the at least one locking element operable to lock onto the locking surface of a respective one of the at least one fastening element (7).

4. The air filter system (30) according to claim 3, wherein the at least one locking element (22) has a hook-shaped end, the hook-shaped end engaging against a respective one of the at least one fastening element (7) and behind the respective one of the at least one fastening element (7) or into a recess or undercut provided at or on the respective one of the at least one fastening element (7).

5. The air filter system (30) according to claim 4, wherein the at least one locking element (22) on the secondary housing (20) is embodied as a resilient metal clamp.

6. The air filter system (30) according to claim 1, wherein the hole of the at least one receptacle (12) on the filter housing (10) is disposed on the outer side of the filter housing facing away from the filter element (1) on inclined filter housing sections which extend under an angle between 45 and 90 degrees in relation to a longitudinal extension direction of the at least one receptacle hole (12).

7. The air filter system (30) according to claim 1, wherein the at least one fastening element (7) is at least four fastening elements (7);
wherein the filter housing (10), the filter element (1) and the secondary housing (20) are secured together by the at least four fastening elements (7).

8. A filter element (1) of the filter system (30) according to claim 1, the filter element comprising:
  an annularly closed filter medium (2);
  an end disk secured to the filter medium;
  at least one fastening element (7), each embodied as an elongated axial protrusion (7) having a first end arranged at and secured onto a radially outer portion of the end disk (8), the elongated axial protrusion (7) elongated in an axial direction extending axially away from the end disk (8);
  wherein when the filter element (1) is accommodated in the filter housing (10) and disposed between the filter housing (10) and the secondary housing (20), a respective one of the at least one locking element (22) of the secondary housing (20) engages with the at least one fastening element (7) such that the secondary housing (20) is clamped onto the filter housing (10).

9. The filter element (1) according to claim 8, wherein
the at least one fastening element (7) axial protrusion extends through and engages into a respective hole (12) provided on the on the filter housing (10).

10. The filter element (1) according to claim 9, wherein
the filter element (1) includes an end disk secured on an axial end of the filter element (1) and sealingly closing the end face of the filter element to separate a raw side from a clean side of the filter medium;
wherein the axial protrusion engages into a recess on the filter housing (10) or into the respective hole (12).

11. The filter element according to claim 10, wherein
the protrusion extends axially from an end disk of the filter element (1) in a mounting direction of the filter element (1) into the filter housing (10).

12. The filter element according to claim 11, further including
a circumferential a sealing element embodied as a seal ring, sealing the filter element and separating a raw side from a clean side in the filter housing (10);
wherein the sealing element is arranged on and secured to the end disk (8).

13. The filter element according to claim 12, wherein
the axial protrusion (7) is arranged at an exterior of the filter housing, spaced outwardly from the sealing element and outside of space enclosed by the filter housing (10) in which the filter element (1) is received.

* * * * *